No. 773,142. PATENTED OCT. 25, 1904.
C. D. HEATON.
FRICTION BLOCK FOR VEHICLE TIRES.
APPLICATION FILED NOV. 19, 1903.
NO MODEL.
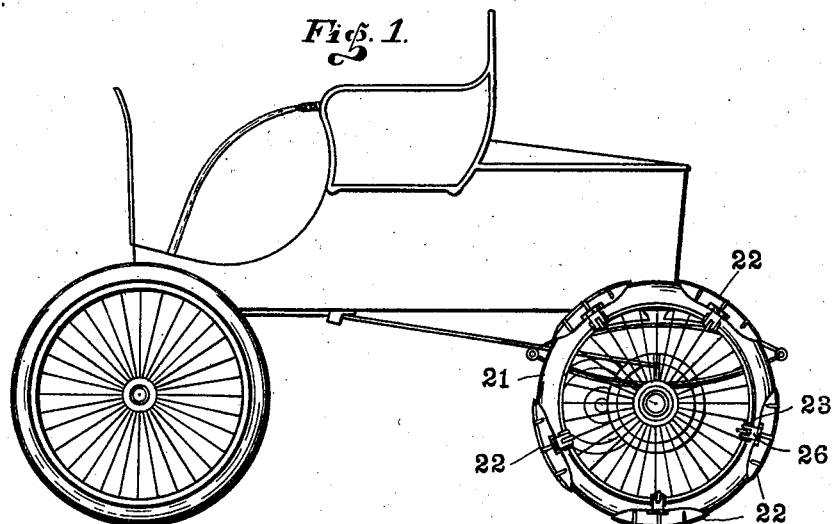
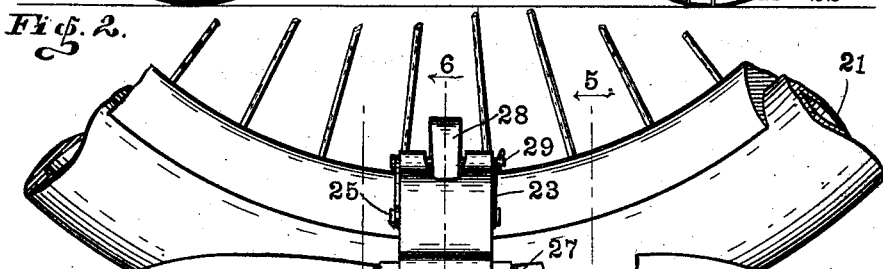
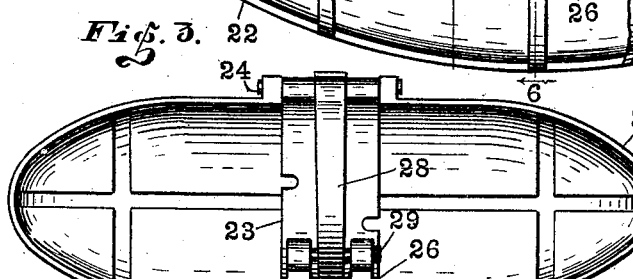
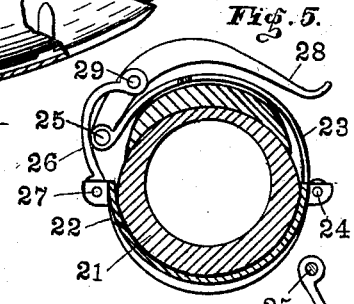
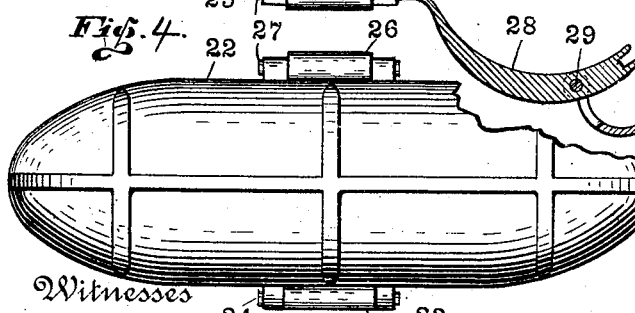
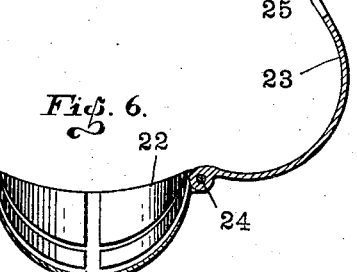
Witnesses
Adelaide Kearns
J. A. Walsh
Inventor
Charles D. Heaton
By Bradford & Hood
Attorneys No. 773,142.

Patented October 25, 1904.

UNITED STATES PATENT OFFICE.

CHARLES D. HEATON, OF VINCENNES, INDIANA.

FRICTION-BLOCK FOR VEHICLE-TIRES.

SPECIFICATION forming part of Letters Patent No. 773,142, dated October 25, 1904.

Application filed November 19, 1903. Serial No. 181,821. (No model.)

*To all whom it may concern:*

Be it known that I, CHARLES D. HEATON, a citizen of the United States, residing at Vincennes, in the county of Knox and State of Indiana, have invented certain new and useful Improvements in Friction-Blocks for Vehicle-Tires, of which the following is a specification.

It frequently happens in driving automobiles, especially in stormy weather, that places in the road are encountered in which the wheels will slip. This is especially true in ascending muddy hills where the earth is of a clayey character.

It is the object of my invention to provide efficient means for preventing such slipping of the wheels in such cases, which means, however, shall be easily and quickly removable, so that the automobile may be used with the wheels in their ordinary condition at all other times.

Said invention consists in friction-blocks and means for attaching them to and detaching them from the wheels, as will be hereinafter more particularly described and claimed.

Referring to the accompanying drawings, which are made a part hereof, and on which similar reference characters indicate similar parts, Figure 1 is a side elevation of an automobile having its driving-wheels equipped with friction-blocks of my invention; Fig. 2, a side elevation, on an enlarged scale, of a fragment of one of the wheels with one of my improved friction-blocks (shown partially in section) attached thereto; Fig. 3, a top or plan view of one of said friction-blocks separately; Fig. 4, an under side plan; Fig. 5, a transverse sectional view of the friction-block at the point indicated by the dotted line 5 5 in Fig. 2; and Fig. 6, a transverse sectional view thereof at a point indicated by the dotted line 6 6 in Fig. 2, but with the attaching devices unfastened and thrown apart.

Automobiles, as is well known, are usually equipped with wheels having rubber tires. These rubber tires slip more easily than many other forms of tires under the conditions above recited. Upon the tires 21 I place, when the conditions require it, a series of friction-blocks 22, which are formed to fit against the surfaces of said tires on their inner sides and the outer sides of which are provided with ribs or projections which are adapted to press into and engage with the surface over which the vehicle is traveling. These blocks may be made in any way desired, as of cast or stamped metal. I prefer to stamp them from sheet metal with dies, and in this form there will be internal grooves corresponding to the external ribs. These grooves where the blocks are fitted to rubber tires will, owing to the compression of the rubber, aid in the engagement between the two parts, and thus assist in preventing any slipping. A clamping-strap 23 is hinged to one side of each friction-block at its upper edge by means of a hinge-pintle 24. At the opposite end this strap is bifurcated and contains a pin 25. A shorter strap 26 is hinged to the opposite side of the friction-block by hinge-pintle 27 and is also bifurcated at its inner end. A clamping-lever 28 is hinged to this shorter strap by hinge-pintle 29, and its inner end is recessed somewhat to fit over the pin 25 on the strap 23. As will be observed by an examination, especially of Fig. 5, the pins 27, 29, and 25 when the clamping devices are folded are so disposed that the pin 25 is above the line extending from the pin 27 to the pin 29, so that the tendency is to hold the clamp closed, and thus hold the friction-block onto the wheel.

The strap 23 is preferably of considerable width, and I prefer to form small notches in its edge (see Fig. 3) which may fit around the adjacent spokes of the wheel, and thus prevent the block from slipping from the position to which it is originally put. As the spokes of such wheel are usually staggered, these notches are formed a little to one side of the center of the structure, as indicated especially in Fig. 3.

I of course use a sufficient number of these friction-blocks to bring them substantially into continuous contact with the surface over which they are traveling in use. For the ordinary sized automobile-wheel five or six are sufficient, and I have shown five on each driving-wheel in the drawings.

Having thus fully described my said inven- tion, what I claim as new, and desire to secure by Letters Patent, is—

1. The combination, with a vehicle-wheel, of a friction-block adapted to be clamped thereto, and clamping devices comprising two strap portions hinged to the side of said block, a lever pivoted to one of said clamp portions and adapted to engage with the other and draw the friction-block forcibly against the wheel-tire with a toggle force.

2. The combination, with a vehicle-wheel, of a friction-block, and means for connecting said friction-block to the wheel comprising a long hinge-strap portion bifurcated and having a pin at its end, a short strap portion also bifurcated, and a lever pivoted to said strap portion and having its end adapted to engage with the pin on the long strap portion, substantially as set forth.

3. The combination, with a vehicle-wheel having a compressible rim, of a rigid shield-like friction-block containing internal grooves into which the compressible substance of the rim will press, and clamping devices for securing said block to the wheel whereby it can be detached and attached at will, substantially as set forth.

In witness whereof I have hereunto set my hand and seal, at Indianapolis, Indiana, this 28th day of October, A. D 1903.

CHARLES D. HEATON. [L. S.]

Witnesses:
ARTHUR M. HOOD,
JAMES A. WALSH.